(12) United States Patent
Cox et al.

(10) Patent No.: US 10,243,491 B2
(45) Date of Patent: Mar. 26, 2019

(54) CONTROL SCHEME TO INCREASE POWER OUTPUT OF A POWER TOOL USING CONDUCTION BAND AND ADVANCE ANGLE

(71) Applicant: Black & Decker Inc., Newark, DE (US)

(72) Inventors: John D. Cox, Lutherville, MD (US); Tal Gottesman, Towson, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/520,261

(22) PCT Filed: Dec. 18, 2015

(86) PCT No.: PCT/US2015/066804
§ 371 (c)(1),
(2) Date: Apr. 19, 2017

(87) PCT Pub. No.: WO2016/100879
PCT Pub. Date: Jun. 23, 2016

(65) Prior Publication Data
US 2017/0366117 A1      Dec. 21, 2017

Related U.S. Application Data

(60) Provisional application No. 62/249,582, filed on Nov. 2, 2015, provisional application No. 62/093,513, filed on Dec. 18, 2014.

(51) Int. Cl.
*G06F 3/01*          (2006.01)
*H02P 6/15*          (2016.01)
(Continued)

(52) U.S. Cl.
CPC ............... *H02P 6/15* (2016.02); *H02K 7/145* (2013.01); *H02K 11/33* (2016.01); *H02P 6/085* (2013.01);
(Continued)

(58) Field of Classification Search
CPC . Y02T 10/46; H02P 6/15; H02P 6/152; H02P 25/14; B62D 5/065
See application file for complete search history.

(56) References Cited

U.S. PATENT DOCUMENTS 658,023 A      9/1900  Shanklin
3,705,537 A    12/1972 Palazzetti et al.
(Continued)

FOREIGN PATENT DOCUMENTS

DE    201 10 943      11/2001
EP    2 127 824       12/2009
(Continued)

OTHER PUBLICATIONS

International Search Report dated Feb. 25, 2016 issued in corresponding PCT application.

*Primary Examiner* — Bickey Dhakal
*Assistant Examiner* — Zoheb Imtiaz
(74) *Attorney, Agent, or Firm* — Amir Rohani

(57) ABSTRACT

A power tool includes a multi-phase BLDC motor, a plurality of switches, an input unit, and a controller. For each phase, the controller operates to vary power output to the motor between a first power and a second power by varying a duty cycle of a PWM signal from 0% to 100% while keeping a conduction band (CB) of corresponding motor switches and/or an advance angle (AA) at a predetermined value when the input unit moves between a first position and a predetermined position between the first and a second position. For each phase, the controller operates to increase
(Continued)

the power output by the motor to greater than the second power by increasing the CB/AA to greater than the predetermined value while keeping the duty cycle of the PWM signal at 100% when the input unit moves between the predetermined position and the second position.

20 Claims, 10 Drawing Sheets

(51) Int. Cl.
- H02K 11/33 (2016.01)
- H02P 7/03 (2016.01)
- H02K 7/14 (2006.01)
- H02P 6/08 (2016.01)
- H02P 27/08 (2006.01)
- B25F 5/00 (2006.01)

(52) U.S. Cl.
CPC .......... *H02P 7/05* (2016.02); *H02P 27/08* (2013.01); *H02P 27/085* (2013.01); *B25F 5/00* (2013.01)

(56) References Cited

U.S. PATENT DOCUMENTS

| | | |
|---|---|---|
| 3,908,130 A | 9/1975 | Lafuze |
| 3,934,710 A | 2/1976 | Tanikoshi |
| 3,937,974 A | 2/1976 | Lafuze |
| 4,005,347 A | 1/1977 | Erdman |
| 4,015,182 A | 3/1977 | Erdman |
| 4,169,990 A | 10/1979 | Lerdman |
| 4,588,936 A | 5/1986 | Itoh et al. |
| 4,608,527 A | 8/1986 | Glennon et al. |
| 4,628,233 A | 12/1986 | Bradus |
| 4,649,245 A | 3/1987 | Lessig, III et al. |
| 4,707,650 A | 11/1987 | Bose |
| 4,737,661 A | 4/1988 | Lessig, III et al. |
| 4,743,815 A | 5/1988 | Gee et al. |
| 4,835,448 A | 5/1989 | Dishner et al. |
| 4,847,526 A | 6/1989 | Takehara et al. |
| 4,879,503 A | 11/1989 | Aoki et al. |
| RE33,379 E | 10/1990 | Bradus |
| 5,038,084 A | 8/1991 | Wing |
| 5,107,151 A | 4/1992 | Cambier |
| 5,168,202 A | 12/1992 | Bradshaw et al. |
| 5,229,693 A | 7/1993 | Futami et al. |
| 5,298,839 A | 3/1994 | Takeda |
| 5,440,215 A | 8/1995 | Gilmore |
| 5,563,482 A | 10/1996 | Shaw et al. |
| 5,583,411 A | 12/1996 | Kusano et al. |
| 5,677,605 A | 10/1997 | Cambier et al. |
| 5,739,651 A | 4/1998 | Miyazawa et al. |
| 5,804,939 A | 9/1998 | Yamai et al. |
| 5,821,722 A | 10/1998 | Forbes et al. |
| 5,901,269 A | 5/1999 | Chang |
| 5,982,122 A | 11/1999 | Hollenbeck et al. |
| 6,034,494 A | 3/2000 | Kitamine et al. |
| 6,060,859 A | 5/2000 | Jonokuchi |
| 6,081,087 A | 6/2000 | Iijima et al. |
| 6,198,240 B1 | 3/2001 | Notohara et al. |
| 6,222,333 B1 | 4/2001 | Garnett et al. |
| 6,236,179 B1 | 5/2001 | Lawler et al. |
| 6,326,748 B1 | 12/2001 | Moroto et al. |
| 6,400,107 B1 | 6/2002 | Nakatani et al. |
| 6,400,108 B1 | 6/2002 | Chen et al. |
| 6,424,798 B1 | 7/2002 | Kitamine |
| 6,518,719 B1 | 2/2003 | Suzuki et al. |
| 6,536,536 B1 | 3/2003 | Gass et al. |
| 6,545,442 B2 | 4/2003 | Sunaga et al. |
| 6,577,097 B2 | 6/2003 | Krefta et al. |
| 6,580,235 B2 | 6/2003 | Laurent |
| 6,605,912 B1 | 8/2003 | Bharadwaj et al. |
| 6,626,002 B1 | 9/2003 | Notohara et al. |
| 6,650,073 B2 | 11/2003 | Kawabata |
| 6,671,459 B1 | 12/2003 | Bultman |
| 6,696,814 B2 | 2/2004 | Henderson et al. |
| 6,790,134 B2 | 9/2004 | Swaddle et al. |
| 6,803,739 B2 | 10/2004 | Miyata et al. |
| 6,879,129 B2 | 4/2005 | Tazawa et al. |
| 6,949,006 B1 | 9/2005 | Chen et al. |
| 6,995,679 B2 | 2/2006 | Eskritt et al. |
| 7,007,762 B2 | 3/2006 | Yamamoto |
| 7,102,306 B2 | 9/2006 | Hamaoka et al. |
| 7,157,870 B2 | 1/2007 | Nakagawa et al. |
| 7,170,243 B2 | 1/2007 | Nakagawa et al. |
| 7,180,256 B2 | 2/2007 | Eskritt et al. |
| 7,193,385 B2 | 3/2007 | Emadi et al. |
| 7,202,622 B2 | 4/2007 | Eskritt et al. |
| 7,205,738 B2 | 4/2007 | Chapman et al. |
| 7,208,895 B2 | 4/2007 | Marcinkiewicz et al. |
| 7,235,940 B2 | 6/2007 | Bosch et al. |
| 7,292,009 B2 | 11/2007 | Kawakami et al. |
| 7,334,648 B2 | 2/2008 | Arimura |
| 7,375,485 B2 | 5/2008 | Shahi et al. |
| 7,385,366 B2 | 6/2008 | Yukitake |
| 7,436,139 B2 | 10/2008 | Maslov et al. |
| 7,551,411 B2 | 6/2009 | Woods et al. |
| 7,560,893 B2 | 7/2009 | Thomson |
| 7,612,520 B2 | 11/2009 | Cryan et al. |
| 7,643,733 B2 | 1/2010 | El-Antably et al. |
| 7,667,423 B2 | 2/2010 | Shahi et al. |
| 7,750,594 B2 | 7/2010 | Clothier et al. |
| 7,755,308 B2 | 7/2010 | Kayikci et al. |
| 7,821,217 B2 | 10/2010 | Abolhassani et al. |
| 7,893,638 B2 | 2/2011 | Akama et al. |
| 7,960,931 B2 | 6/2011 | Rodriguez et al. |
| 8,040,090 B2 | 10/2011 | Kitagawa |
| 8,212,504 B2 | 7/2012 | Ogahara |
| 8,226,372 B2 | 7/2012 | Hamaoka et al. |
| 8,313,012 B2 | 11/2012 | Shima et al. |
| 8,395,337 B2 | 3/2013 | Onishi et al. |
| 8,403,072 B2 | 3/2013 | Eshleman et al. |
| 8,418,778 B2 | 4/2013 | Eshleman et al. |
| 8,432,123 B2 | 4/2013 | Hofmann |
| 8,450,988 B2 | 5/2013 | Kung |
| 8,476,853 B2 | 7/2013 | Vanko et al. |
| 8,487,564 B2 | 7/2013 | Kitagawa et al. |
| 8,564,236 B2 | 10/2013 | Hirabayashi et al. |
| 8,587,230 B2 | 11/2013 | Pant et al. |
| 8,610,386 B2 | 12/2013 | Asukai |
| 8,616,299 B2 | 12/2013 | Ichikawa |
| 8,643,319 B2 | 2/2014 | Celik |
| 8,686,675 B2 | 4/2014 | Kawano et al. |
| 8,689,900 B2 | 4/2014 | Miwa et al. |
| 8,798,004 B2 | 8/2014 | Skinner |
| 8,800,679 B2 | 8/2014 | Eshleman et al. |
| 8,800,680 B2 | 8/2014 | Eshleman et al. |
| 8,847,532 B2 | 9/2014 | Miyazaki et al. |
| 8,931,576 B2 | 1/2015 | Iwata |
| 8,941,349 B2 | 1/2015 | Inoue |
| 9,018,872 B2 | 1/2015 | Inoue et al. |
| 9,106,164 B2 | 8/2015 | Seki et al. |
| 9,114,519 B2 | 8/2015 | Iwata et al. |
| 9,154,062 B2 | 10/2015 | Yanagihara et al. |
| 9,197,146 B2 | 11/2015 | Mergener et al. |
| 9,225,273 B2 | 12/2015 | Sato |
| 9,240,747 B2 | 1/2016 | Vanko |
| 9,240,749 B2 | 1/2016 | Green et al. |
| 9,276,509 B2 | 3/2016 | Kato et al. |
| 2001/0043806 A1 | 11/2001 | Gorti et al. |
| 2003/0121685 A1 | 7/2003 | Yamamoto |
| 2004/0017119 A1 | 1/2004 | Yamamoto et al. |
| 2006/0038537 A1 | 2/2006 | Heigl |
| 2006/0261766 A1 | 11/2006 | Nakagawa et al. |
| 2007/0152624 A1 | 7/2007 | Hamaoka et al. |
| 2007/0267990 A1 | 11/2007 | Abolhassani et al. |
| 2008/0265695 A1 | 10/2008 | Yoshida et al. |
| 2009/0160373 A1 | 6/2009 | Katou et al. |
| 2009/0295313 A1 | 12/2009 | Suzuki et al. |
| 2010/0237809 A1* | 9/2010 | Ogahara .............. H02P 6/182 318/400.13 |
| 2010/0251510 A1 | 10/2010 | Clothier et al. |

(56) References Cited

U.S. PATENT DOCUMENTS

| | | |
|---|---|---|
| 2010/0253264 A1 | 10/2010 | Clothier et al. |
| 2010/0253265 A1 | 10/2010 | Clothier et al. |
| 2010/0307782 A1 | 12/2010 | Iwata et al. |
| 2011/0000688 A1 | 1/2011 | Iwata |
| 2011/0037423 A1 | 2/2011 | Koda et al. |
| 2011/0273117 A1 | 11/2011 | Nakamura et al. |
| 2011/0279070 A1 | 11/2011 | Tanaka et al. |
| 2012/0074878 A1 | 3/2012 | Pant et al. |
| 2012/0074881 A1 | 3/2012 | Pant |
| 2012/0191250 A1 | 7/2012 | Iwata et al. |
| 2012/0247796 A1 | 10/2012 | Mueller et al. |
| 2012/0319626 A1 | 12/2012 | Wichert et al. |
| 2013/0008676 A1 | 1/2013 | Eshleman et al. |
| 2013/0015789 A1* | 1/2013 | Miyazaki ............ B25F 5/00 318/139 |
| 2013/0020102 A1 | 1/2013 | Bjornlinger et al. |
| 2013/0228353 A1 | 9/2013 | Chen et al. |
| 2013/0314007 A1 | 11/2013 | Yanagihara et al. |
| 2014/0084823 A1 | 3/2014 | Lee |
| 2014/0174824 A1 | 6/2014 | Schamberger et al. |
| 2014/0210379 A1* | 7/2014 | Kato ............ H02P 6/15 318/139 |
| 2014/0352995 A1 | 12/2014 | Matsunaga et al. |
| 2015/0034349 A1 | 2/2015 | Proudlock |
| 2015/0042246 A1 | 2/2015 | Tadokoro et al. |
| 2015/0222212 A1 | 8/2015 | Iwata |
| 2015/0290784 A1 | 10/2015 | Andres et al. |
| 2015/0352699 A1 | 12/2015 | Sakai et al. |
| 2016/0043620 A1 | 2/2016 | Li et al. |
| 2016/0049890 A1 | 2/2016 | Mergener et al. |
| 2016/0211791 A1 | 7/2016 | Green et al. |

FOREIGN PATENT DOCUMENTS

| | | |
|---|---|---|
| EP | 1 738 877 | 9/2011 |
| EP | 2 329 922 | 4/2013 |
| EP | 2 391 483 | 6/2013 |
| EP | 2 656 485 | 5/2015 |
| EP | 2 623 267 | 8/2015 |
| JP | 04-183253 | 6/1992 |
| JP | 07-337067 | 12/1995 |
| JP | 09-247976 | 9/1997 |
| JP | 2000-069788 | 3/2000 |
| JP | 2000-334625 | 12/2000 |
| JP | 2000-354392 | 12/2000 |
| JP | 2002-315381 | 10/2002 |
| JP | 2001-238482 | 8/2004 |
| JP | 2005-001039 | 1/2005 |
| JP | 2005-169535 | 6/2005 |
| JP | 2005-176458 | 6/2005 |
| JP | 2009-131934 | 6/2009 |
| JP | 2010-041741 | 2/2010 |
| JP | 2010-064544 | 3/2010 |
| JP | 2010-98922 | 4/2010 |
| JP | 2010-173054 | 8/2010 |
| JP | 2010-178488 | 8/2010 |
| JP | 2011-011313 | 1/2011 |
| JP | 2012-066334 | 4/2012 |
| JP | 2012-071407 | 4/2012 |
| JP | 2013-022665 | 2/2013 |
| WO | 2005/025050 | 3/2005 |

* cited by examiner

CONTROL SCHEME TO INCREASE POWER OUTPUT OF A POWER TOOL USING CONDUCTION BAND AND ADVANCE ANGLE

CROSS-REFERENCE TO RELATED APPLICATIONS

This application is a national stage entry of PCT Application No. PCT/US2015/066804, filed Dec. 18, 2015, which claims the benefit of U.S. Provisional Application No. 62/093,513, filed on Dec. 18, 2014, and U.S. Provisional Application No. 62/249,582, filed on Nov. 2, 2015. The entire disclosures of the applications referenced above are incorporated herein by reference.

FIELD

The present disclosure relates generally to power tools and more particularly to control schemes based on one or more of conduction band, advance angle, and battery voltage for use in power tools.

BACKGROUND

Power tools may be of different types depending on the type of output provided by the power tool. For example, a power tool may be a drill, hammer, grinder, impact wrench, circular saw, reciprocating saw, and so on. Some power tools may be powered by an alternating current (AC) power source while others may be portable and may be powered by a direct current (DC) power source such as a battery pack. Power tools may use AC or DC motors.

Some power tools have a movable switch such as a trigger or a speed dial that can be used to vary the speed of the motor or the power output by the tool. The switch can be moved from a resting position where the power output of the tool is minimum (e.g., zero), and a fully activated (e.g., pulled) position where the power output of the tool is maximum. Thus, the tool can output the maximum power only when the trigger is fully activated. Also, after the trigger is fully activated, the tool's power output cannot be increased beyond its maximum power. The present disclosure addresses these and other issues related to power tools as described below in the detail.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one embodiment, a power tool comprises a brushless direct current (BLDC) motor having a stator defining a plurality of phases, a switching arrangement having a plurality of motor switches connected electrically between a power source and the BLDC motor and operates to deliver power to the BLDC motor, an input unit operable between a first position and a second position and outputs a signal indicating an amount of power to be delivered to the BLDC motor; and a controller interfaced with the input unit and the plurality of motor switches. For each phase, the controller operates to output a pulse-width modulated (PWM) signal having a duty cycle to one or more of the plurality of motor switches to control supply of power to the BLDC motor. For each phase, the controller operates to control one or more of a conduction band of the one or more of the plurality of motor switches and an advance angle of the conduction band. For each phase, the controller operates to vary power output to the BLDC motor between a first power and a second power by varying the duty cycle of the PWM signal while keeping the conduction band and the advance angle at a predetermined value in response to the input unit moving between the first position and a predetermined position between the first and second positions. For each phase, the controller operates to increase the power output to the BLDC motor to greater than the second power by increasing the one or more of the conduction band and the advance angle to greater than the predetermined value while keeping the duty cycle constant in response to the input unit moving between the predetermined position and the second position.

In other features, the controller further operates to, for each phase, keep the conduction band at the predetermined value in response to the input unit moving between the first position and the predetermined position between the first and second positions; and increase the conduction band to greater than the predetermined value while keeping the duty cycle at 100% in response to the input unit moving between the predetermined position and the second position.

In other features, the controller further operates to, for each phase, keep the advance angle at the predetermined value in response to the input unit moving between the first position and the predetermined position between the first and second positions; and increase the advance angle to greater than the predetermined value while keeping the duty cycle at 100% in response to the input unit moving between the predetermined position and the second position.

In other features, in response to a number of the plurality of phases being three, for each phase, the predetermined value of the conduction band and the advance angle is 120 degrees and 30 degrees, respectively. For each phase, the one or more of the conduction band and the advance angle is varied linearly. For each phase, the one or more of the conduction band and the advance angle is varied in a stepwise fashion.

In other features, the first and second positions respectively represent no displacement and full displacement of the input unit. The predetermined position of the input unit represents 80% of a fully displaced position of the input unit. The input unit is a variable speed trigger switch, a speed dial, a touch sensor, or a capacitive sensor. The input unit is capable of performing one or more of ON/OFF, forward/reverse, and variable speed operations.

In another embodiment, a control system for a power tool comprises and input unit and a control unit. The input unit is capable of moving between a first position and a second position to vary an amount of power output to a brushless direct current (BLDC) motor of the power tool. The BLDC motor has a stator defining a plurality of phases. For each phase, the control unit is configured to generate a control signal to drive one or more of a plurality of switches. For each phase, the control unit is configured to control the amount of power output to the BLDC motor by varying one or more parameters of the control signal and the one or more of the plurality of switches based on movement of the input unit. For each phase, the control unit is configured to control the amount of power output to the BLDC motor between a first power level and a second power level by varying a first parameter of the control signal between a first value and a second value while maintaining a second parameter of the plurality of switches at a predetermined value in response to the input unit moving between the first position and a predetermined position between the first and second positions. For each phase, the control unit is configured to increase the amount of power output to the BLDC motor to greater than the second power level by increasing the second parameter to greater than the predetermined value while maintaining the first parameter at the second value in response to the input unit moving between the predetermined position and the second position.

In other features, for each phase, the control signal is a pulse-width modulated (PWM) signal, the first parameter is a duty cycle of the PWM signal, and the second parameter is one or more of a conduction band of the plurality of switches and an advance angle of the conduction band. For each phase, the control unit is configured to control the amount of power output to the BLDC motor between the first power level and the second power level by varying the duty cycle of the PWM signal from 0% to 100% while maintaining the one or more of the conduction band and the advance angle at the predetermined value in response to the input unit moving between the first position and the predetermined position between the first and second positions. For each phase, the control unit is configured to increase the amount of power output to the BLDC motor to greater than the second power level by increasing the one or more of the conduction band and the advance angle to greater than the predetermined value while maintaining the duty cycle at 100% in response to the input unit moving between the predetermined position and the second position.

In other features, in response to a number of the plurality of phases being three, for each phase, the predetermined value of the conduction band and the advance angle is 120 degrees and 30 degrees, respectively. For each phase, the one or more of the conduction band and the advance angle is varied linearly. For each phase, the one or more of the conduction band and the advance angle is varied in a stepwise fashion.

In other features, the first and second positions respectively represent no displacement and full displacement of the input unit. The predetermined position of the input unit represents 80% of a fully displaced position of the input unit. The input unit is a variable speed trigger switch, a speed dial, a touch sensor, or a capacitive sensor. The input unit is capable of performing one or more of ON/OFF, forward/reverse, and variable speed operations.

In another embodiment, a power tool powered by a battery comprises a brushless direct current (BLDC) motor having a stator defining a plurality of phases; a switching arrangement having a plurality of motor switches connected electrically between the battery and the BLDC motor and operates to deliver power from the battery to the BLDC motor; a voltage detector circuit to detect voltage of the battery; and a controller interfaced with the voltage detector circuit and the plurality of motor switches. For each phase, the controller operates to output a pulse-width modulated (PWM) signal to one or more of the plurality of motor switches to control supply of power to the BLDC motor. For each phase, the controller operates to control one or more of a conduction band of the one or more of the plurality of motor switches and an advance angle of the conduction band. For each phase, the controller operates to control the power output to the BLDC motor by keeping the one or more of the conduction band and the advance angle at a predetermined value in response to the voltage of the battery being greater than or equal to a predetermined threshold. The controller operates to increase the one or more of the conduction band and the advance angle to greater than the predetermined value in response to the voltage of the battery being less than the predetermined threshold.

In other features, the controller further operates to, for each phase, control the power output to the BLDC motor by keeping the conduction band at the predetermined value in response to the voltage of the battery being greater than or equal to the predetermined threshold; and increase the conduction band to greater than the predetermined value in response to the voltage of the battery being less than the predetermined threshold.

In other features, the controller further operates to, for each phase, control the power output by the BLDC motor by keeping the advance angle at the predetermined value in response to the voltage of the battery being greater than or equal to the predetermined threshold; and increase the advance angle to greater than the predetermined value in response to the voltage of the battery being less than the predetermined threshold.

In other features, the controller further operates to, for each phase, continue increasing the one or more of the conduction band and the advance angle until the voltage of the battery decreases to less than or equal to a cutoff value that is less than the predetermined threshold. The cutoff value represents a predetermined voltage level of a cell of the battery.

In other features, the controller further operates to stop supplying power to the BLDC motor in response to the voltage of the battery decreasing to less than or equal to a cutoff value that is less than the predetermined threshold. The controller further operates to stop supplying power to the BLDC motor in response to the controller detecting one or more of the following conditions: battery temperature exceeding a threshold, tool temperature exceeding a threshold, and current drawn from the battery or supplied to the BLDC motor exceeding a threshold.

In other features, the predetermined threshold is greater than zero and less than a rated voltage of the battery. For each phase, the one or more of the conduction band and the advance angle is varied linearly. For each phase, the one or more of the conduction band and the advance angle is varied in a stepwise fashion. For each phase, varying the one or more of the conduction band and the advance angle in relation to the voltage of the battery includes a curved or stepped profile.

In another embodiment, a control system for a power tool operated by a battery comprises a detector to detect voltage of the battery and a control unit. For each of a plurality of phases of a brushless direct current (BLDC) motor of the power tool, the control unit is configured to generate a control signal to drive one or more of a plurality of switches. For each phase, the control unit is configured to control an amount of power output to the motor by maintaining one or more of a conduction band of the one or more of the plurality of switches and an advance angle of the conduction band at a predetermined value in response to the voltage of the battery being greater than or equal to a predetermined threshold. The control unit is configured to increase the one or more of the conduction band and the advance angle to greater than the predetermined value in response to the voltage of the battery being less than the predetermined threshold.

In other features, the control unit is further configured to, for each phase, control the power output to the BLDC motor by keeping the conduction band at the predetermined value in response to the voltage of the battery being greater than or equal to the predetermined threshold; and increase the conduction band to greater than the predetermined value in response to the voltage of the battery being less than the predetermined threshold.

In other features, the control unit is further configured to, for each phase, control the power output to the BLDC motor by keeping the advance angle at the predetermined value in response to the voltage of the battery being greater than or equal to the predetermined threshold; and increase the advance angle to greater than the predetermined value in response to the voltage of the battery being less than the predetermined threshold.

In other features, the control unit is further configured to, for each phase, continue increasing the one or more of the conduction band and the advance angle until the voltage of the battery decreases to less than or equal to a cutoff value that is less than the predetermined threshold. The cutoff value represents a predetermined voltage level of a cell of the battery.

In other features, the control unit is further configured to stop supplying power to the BLDC motor in response to the voltage of the battery decreasing to less than or equal to a cutoff value that is less than the predetermined threshold. The control unit is further configured to stop supplying power to the BLDC motor in response to the controller detecting one or more of the following conditions: battery temperature exceeding a threshold, tool temperature exceeding a threshold, and current drawn from the battery or supplied to the BLDC motor exceeding a threshold.

In other features, the predetermined threshold is greater than zero and less than a rated voltage of the battery. For each phase, the one or more of the conduction band and the advance angle is varied linearly. For each phase, the one or more of the conduction band and the advance angle is varied in a stepwise fashion. For each phase, varying the one or more of the conduction band and the advance angle in relation to the voltage of the battery includes a curved or stepped profile.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
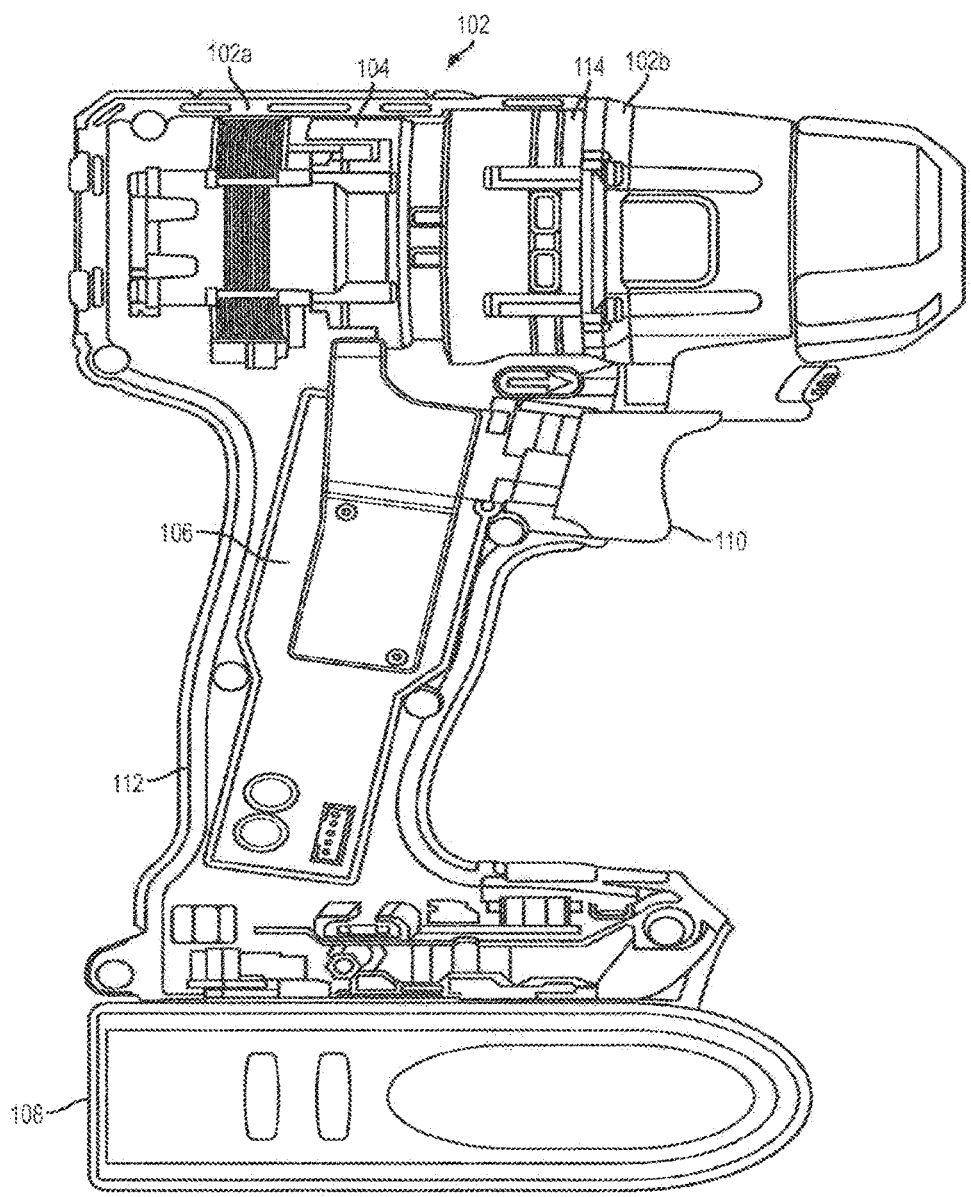
FIG. 1 is a cross-sectional view of an example power tool.

Referring to the FIG. 1, a power tool 100 constructed in accordance with the teachings of the present disclosure is illustrated in a longitudinal cross-section view. The power tool 100 in the particular example provided may be a drill or impact driver, but it will be appreciated that the teachings of this disclosure is merely exemplary and the power tool of this invention could be a hammer, grinder, impact wrench, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102, a motor assembly 104, a control module 106, an input unit (e.g., a variable speed trigger) 110, a transmission assembly 114, an output spindle, and a chuck that can be coupled for rotation with the output spindle. The tool housing 102 is coupled to a gear case 103 and additionally includes handle 112.

According to an embodiment, the motor 104 is received in the housing 102. The motor can be any type of motor and may be powered by an appropriate power source (electricity, pneumatic power, hydraulic power). In the particular example provided, the motor is a brushless DC electric motor and is powered by a battery pack (not shown). An input unit 110 is mounted in the handle 112. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110, supplies the drive signals to the motor. In the exemplary embodiment of the invention, the control unit 106 is provided in the handle 112.

Construction details of the brushless motor 104 or the control unit 106 are beyond the scope of this disclosure, and can be found in co-pending International Patent Publication No. WO2011159674 by the same assignee as this application, which is incorporated herein by reference in its entirety. The brushless motor 104 depicted in FIG. 1 is commutated electronically by the control unit 106. The control unit 106 may include, for example, a programmable micro-controller, micro-processor, or other programmable module) or a non-programmable brushless control integrated circuit, configured to control supply of DC power to the motor 104 and accordingly commutate the motor 104. Alternatively, the control unit 106 may include an application-specific integrated circuit (ASIC) configured to execute commutation of the motor 104. The tool 100 is powered by a suitable power source such as a battery pack 108. It is envisioned, however, that the present disclosures can be applied to a power tool with an AC power source, which in some embodiments may further include a full-wave or half-wave rectifier to power to motor. Using the variable-speed input and other inputs from the input unit 110, the control unit 106 controls the amount of power supplied to the motor 104. In an exemplary embodiment, the control unit 106 controls the pulse width modulation (PWM) duty cycle of the DC power supplied to the motor 104.

Figure 2A:
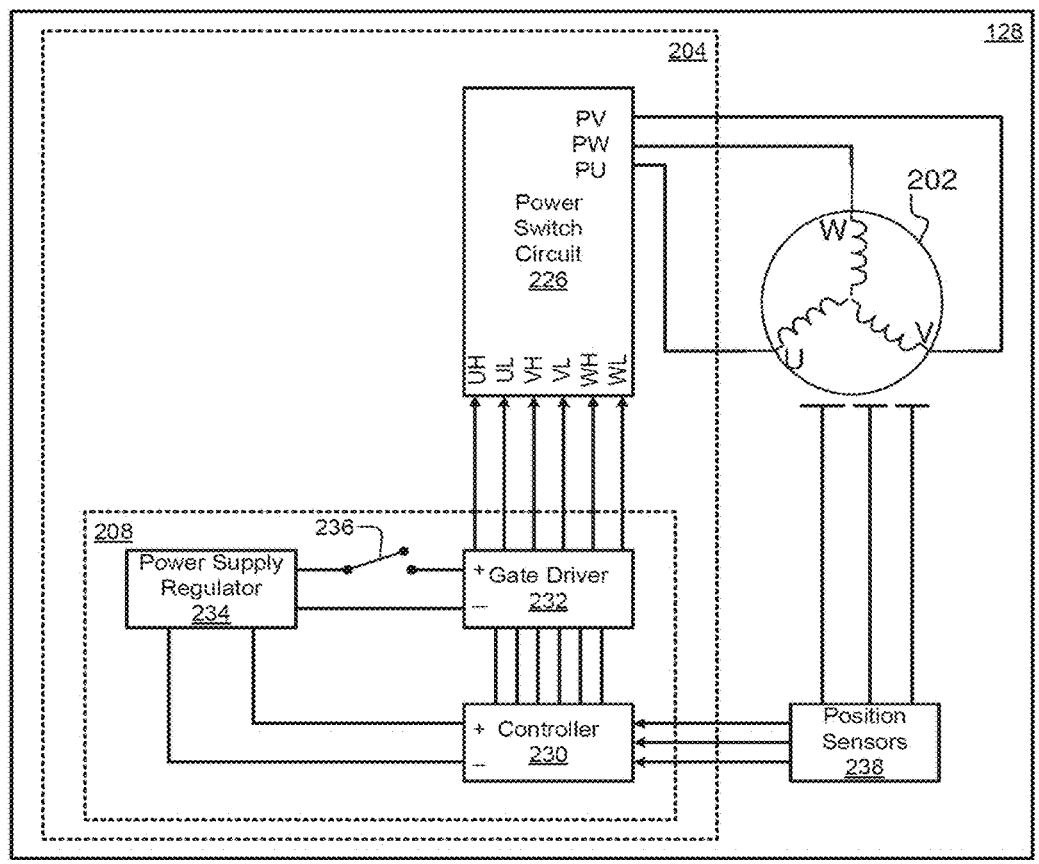
FIG. 2A is an example motor control system which may be employed by a power tool.
Figure 2B:
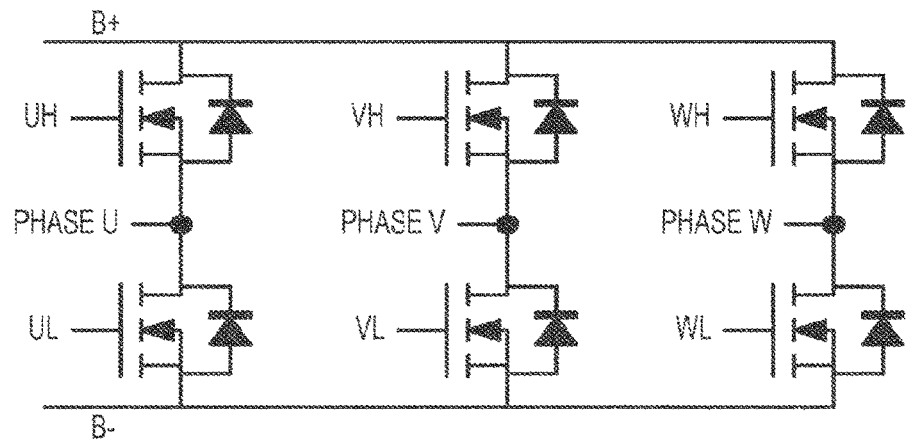
FIG. 2B is a schematic of a three-phase inverter bridge circuit.

Referring to FIGS. 2A and 2B, an example motor control system 128 that may be employed by the power tool 100 is described. In an example embodiment, the motor control system 128 includes a motor control circuit 204 to control supply of power from a power source (e.g., a battery) to a BLDC motor 202. The motor control circuit 204 further includes a power switch circuit 226 that receives power from the power source and a control unit 208 that controls the supply of power from the power source to a BLDC motor 202 as further discussed below.

In an example embodiment, the power switch circuit 226 may be a three-phase bridge driver circuit including six controllable semiconductor power devices (e.g., FETs, BJTs, IGBTs, etc.). FIG. 2B depicts an exemplary power switch circuit 226 having a three-phase inverter bridge circuit, according to an embodiment. As shown, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL, as discussed below. In an embodiment, the sources of the high-side FETs are coupled to the drains of the low-side FETs to output power signals PU, PV, and PW for driving the BLDC motor 202.

Referring back to FIG. 2A, the control unit 208 includes a controller 230, a gate driver 232, a power supply regulator 234, and a power switch 236. In the example embodiment, the controller 230 is a programmable device arranged to control a switching operation of the power devices in power switching circuit 226. The controller 230 receives rotor rotational position signals from a set of position sensors 238 provided in close proximity to the motor 202 rotor. In one embodiment, the position sensors 238 may be Hall sensors. It should be noted, however, that other types of positional sensors may be alternatively utilized. It should also be noted that controller 230 may be configured to calculate or detect rotational positional information relating to the motor 202 rotor without any positional sensors (in what is known in the art as sensorless brushless motor control). The controller 230 also receives a variable-speed signal from variable-speed actuator (not shown) discussed above. Based on the rotor rotational position signals from the position sensors 238 and the variable-speed signal from the variable-speed actuator, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In the example embodiment, the power supply regulator 234 may include one or more voltage regulators to step down the voltage from the power source to a voltage level compatible for operating the controller 230 and/or the gate driver 232. In one embodiment, power supply regulator 234 may include a buck converter and/or a linear regulator to reduce the voltage of the power source to, for example, 15V for powering the gate driver 232, and down to, for example, 3.2V for powering the controller 230.

In the example embodiment, a power switch 236 may be provided between the power supply regulator 234 and the gate driver 232. The power switch 236 may be an ON/OFF switch coupled to the ON/OFF trigger or the variable-speed actuator to allow the user to begin operating the motor 202, as discussed above. The power switch 236 in this embodiment disables supply of power to the motor 202 by cutting power to the gate drivers 232. It is noted, however, that the power switch 236 may be provided at a different location, for example, between the power source and the power switch circuit 226. It is further noted that in an embodiment, the power tool 100 may be provided without an ON/OFF switch 236, and the controller 230 may be configured to activate the power devices in the power switch circuit 226 when the ON/OFF trigger (or variable-speed actuator) is actuated by the user.

Figure 3:
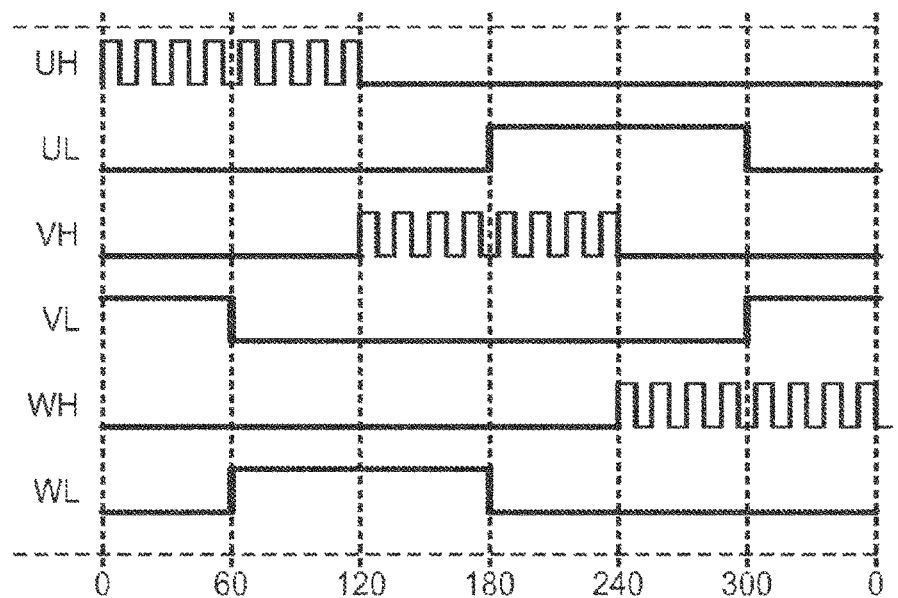
FIG. 3 is a diagram depicting an example waveform of the PWM drive sequence.

FIG. 3 depicts a waveform diagram of an exemplary pulse-width modulation (PWM) control sequence of the three-phase inventor bridge of FIG. 2. As shown in this figure, within a full 360° cycle, each power switch is activated during a 120° conduction band. For each phase, the high-side switch is pulse-width modulated by the control unit 106 within a 120° conduction band. During the conduction band of the high-side switch, the corresponding low-side switch is kept low. The low-side switch is turned on for a full 120° conduction band within a half cycle (180°) after the conduction band of the high-side switch. The control unit 106 controls the voltage provided to the motor, and thus the speed of the motor, via PWM control of the high-side switches.

It is noted that while the waveform diagram of FIG. 3 depicts one exemplary PWM technique, other PWM methods may also be utilized. One such example is PWM control with synchronous rectification, in which the high-side and low-side switches of each phase are PWM-controlled with synchronous rectification within the same 120° conduction band.

Figure 4:
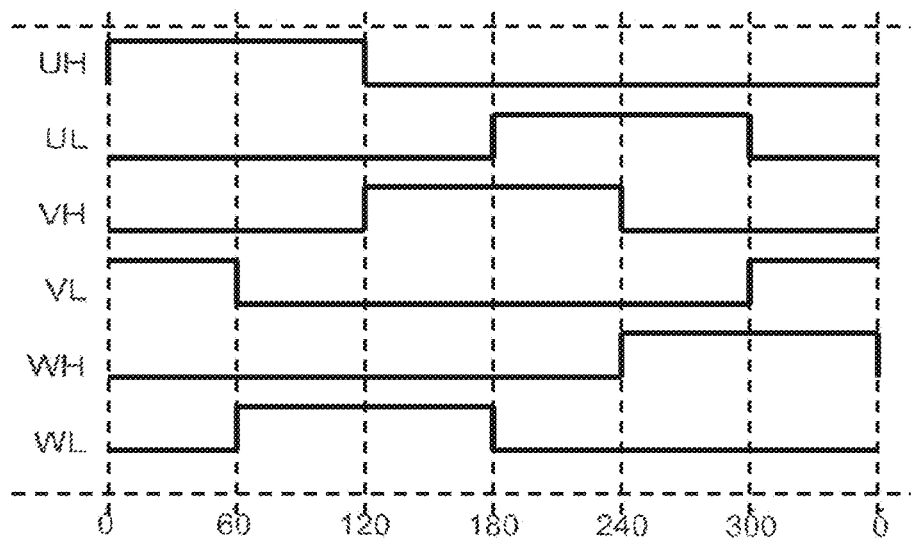
FIG. 4 is a diagram depicting an example waveform of the PWM drive sequence operating at full speed.

FIG. 4 depicts a waveform diagram of the control sequence of the three-phase inventor bridge discussed above operating at full-speed. In this figure, the three high-side FETs conduct at 100% PWM duty cycle during their respective 120° conduction bands, providing maximum power to the motor to operate at full-speed.

Figure 5:
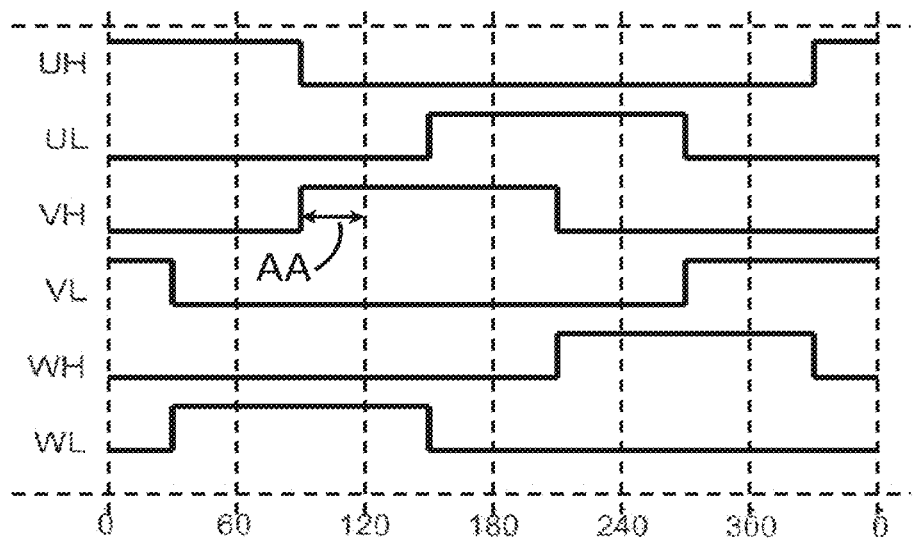
FIG. 5 is a diagram depicting an example waveform of the PWM drive sequence with an advance angle of thirty degrees.

FIG. 5 depicts the waveform diagram of the control sequence of FIG. 4, shown with an advance angle (AA) of 30°. In BLDC systems, due to inefficiencies associated with the power component commutation and the inductance of the motor itself, the current will lag the back-EMF of the motor. As a result, the BLDC motor will not produce the maximum torque that it is capable of. For this reason, the conduction bands of the power switches are shifted by an advance angle of, in this case 30°, to maximize the amount of torque that the motor is capable of producing.

Figure 6:
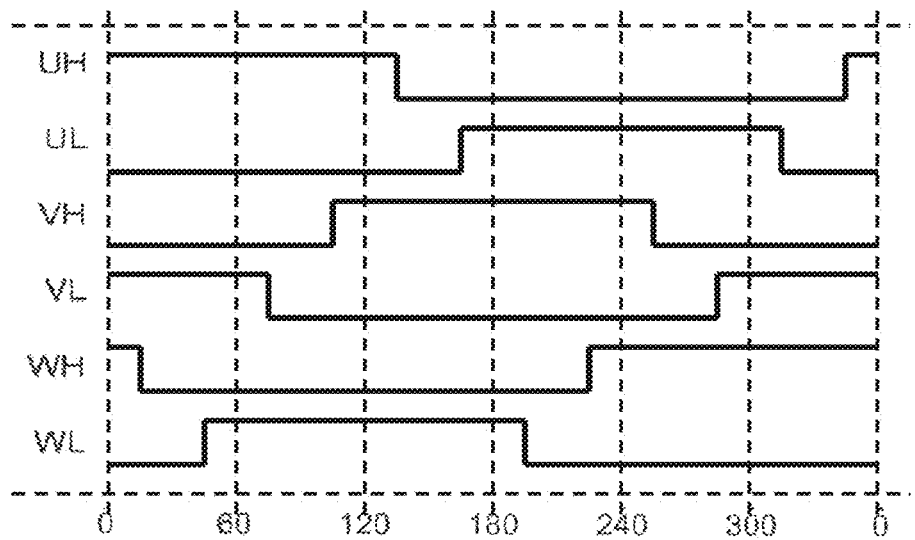
FIG. 6 is a diagram depicting an example waveform of the PWM drive sequence with a conduction band greater than 120 degrees.

FIG. 6 depicts a waveform diagram of the control sequence of the three-phase inventor bridge discussed above with a conduction band of over 120°, according to an embodiment of the invention. In an embodiment, increasing the conduction band of the brushless motor phases to over 120° results in increased output power and increased speed for a given torque amount. In this illustrative example, the conduction band is set to 150°.

Figure 7:
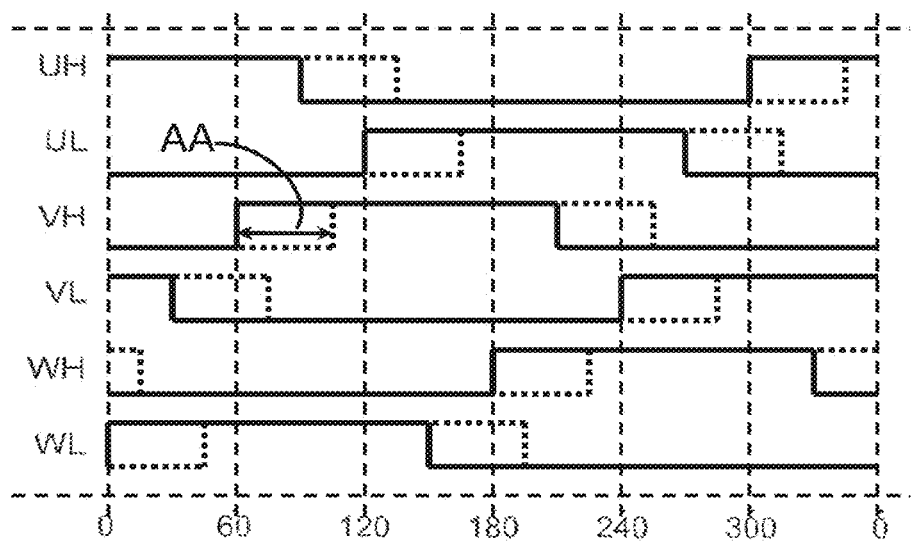
FIG. 7 is a diagram depicting an example waveform of the PWM drive sequence where the advance angle is varied in tandem with the conduction band.

FIG. 7 depicts an embodiment of the invention where the advance angle of each phase of the brushless motor is varied depending on the conduction band. In the illustrative example, where the conduction band is at 150°, the advance angle is set to 45°. In an embodiment, various conduction band/advance angle (CB/AA) correlations may be programmed in the control unit 106 as a look-up table or an equation defining the relationship. It was found by the inventors that controlling the CB and AA in tandem yields the best output speed, output power, and efficiency in various power tool applications. Table 1 below is an exemplary table showing various CB/AA values.

| CB | AA |
|---|---|
| 120° | 30° |
| 130° | 35° |
| 140° | 40° |
| 150° | 45° |
| 160° | 50° |

Power tools applications generally have a top rated speed, which refers to the maximum speed of the power tool motor at no load. In variable-speed tools, the maximum speed typically corresponds to the speed of the motor at full trigger pull. Power tool motors are designed to operate at a specific rated voltage to produce the power tool's desired top rated speed. In other words, the motor size, number of windings, windings configuration, etc. are optimized to handle the motor torque and max speed requirements. As discussed above, operating a motor at a CB/AA level of higher than 120/30° increases the motor power output, and thus motor speed at a given torque. However, a power tool motor having a top rated speed of, for example, 2100 RPM does not benefit from being operated at a high CB/AA level. In fact, it is often necessary to protect the motor and the power tool transmission from exceeding the top rated speed.

Figure 8:
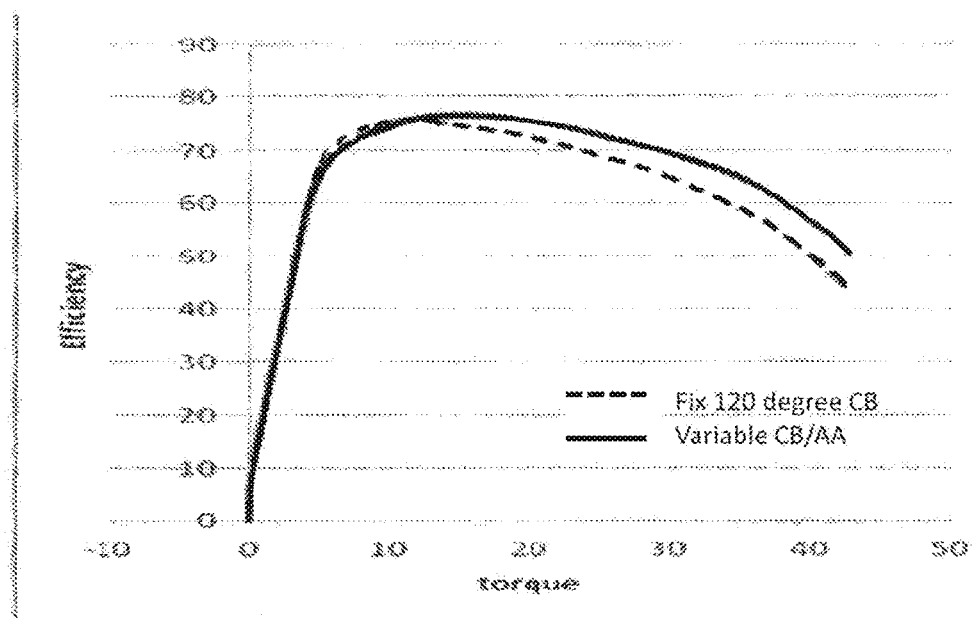
FIG. 8 is a diagram depicting an example of improvement in motor efficiency when a power tool motor is operated by varying conduction band/advance angle rather than at a constant conduction band/advance angle.
Figure 9:
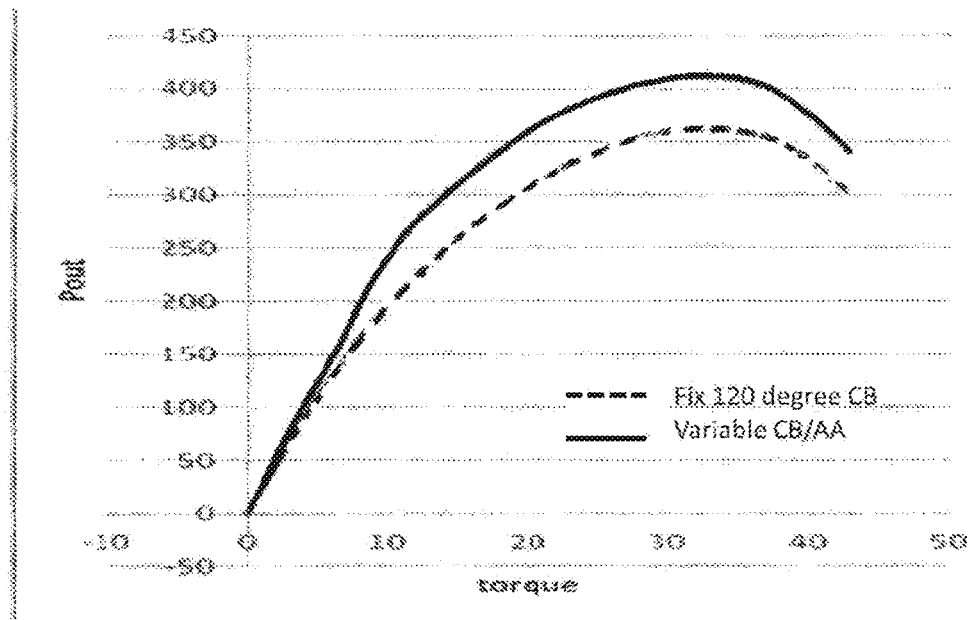
FIG. 9 is a diagram depicting an example of improvement in motor power output when a power tool motor is operated by varying conduction band/advance angle rather than at a constant conduction band/advance angle.

FIGS. 8 and 9 respectively depict the motor efficiency and power output are both improved in a power tool motor operated via the variable CB/AA method described above compared to the same power tool operated at a constant CB/AA of 120/30°. As shown in FIG. 8, system efficiency is comparable at low torque, but increases using the variable CB/AA method after approximately 10 In-Oz. As shown in FIG. 9, the tool power output is higher using the variable CB/AA method of the invention at substantially all torque ranges.

It is noted that while the disclosure above refers to a variable CB/AA (conduction band and advance angle), increasing the conduction band alone without changing the advance angle also results in higher speed, efficiency, and power output levels, though increasing both the conduction band and advance angle in tandem as discussed above is most effective. Thus, while in this disclosure references are made to CB/AA, it must be understood that using variable conduction band alone without changing the advance angle is well within the scope of this disclosure. For example, with reference to FIG. 8, it is feasible to vary conduction band (CB) alone at low torque in order to keep constant speed until a high CB threshold of, for example, 160° is reached and maintain CB at 160° thereafter, all while maintaining the same advance angle.

It must also be understood that the values used herein are exemplary and may vary depending on the power tool application, mode, etc. For example, the starting CB/AA of 120/30° may be suitable for certain high-speed power tools such as drills, whereas a higher AA may be suitable for high-power power tools such as impact drivers.

Another aspect of the invention is discussed herein. As discussed above, the power tool of FIG. 1 is a variable-speed power tools powered by a DC battery 108, where the speed of the motor is controlled via input unit 110. The input unit 110 may be a trigger switch, although other variable-speed input units such as speed dials, conductive sensors, etc. may also be utilized.

Figure 10:
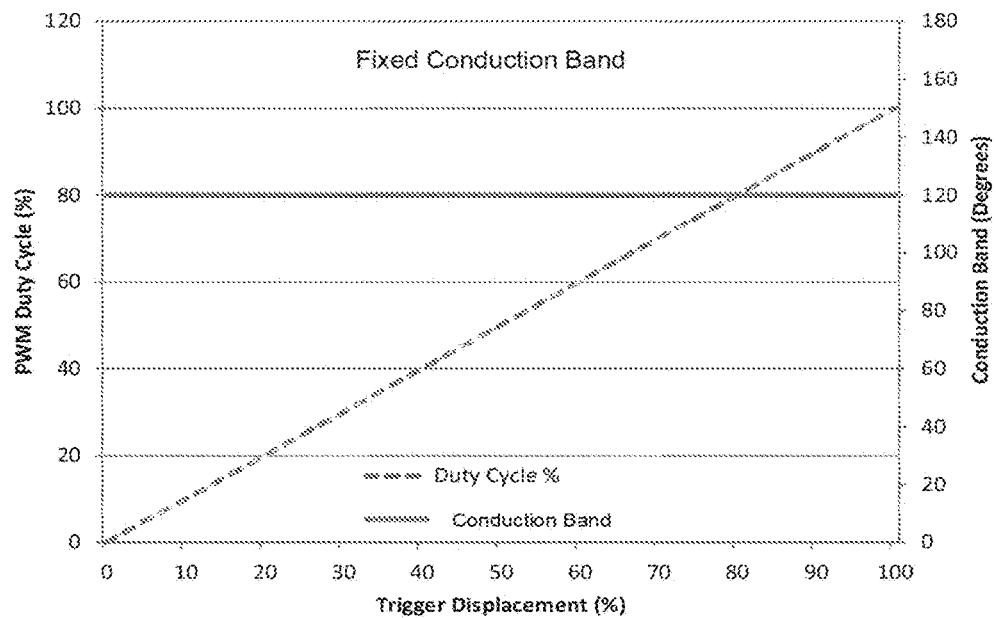
FIG. 10 is a diagram depicting an example of a relationship between speed (i.e., PWM duty cycle) vs. trigger displacement (percentage of trigger pull), and conduction band vs. trigger displacement, in a power tool with fixed conduction angle.

FIG. 10 is an exemplary conventional graph depicting the relationship between speed (i.e., PWM duty cycle) vs. trigger displacement (percentage of trigger pull), and conduction band vs. trigger displacement, in a variable-speed DC power tool. As shown herein, conventional power tools are configured such that the motor duty cycle is increased from 0 (no conduction) to 100% (full conduction) as the trigger is engaged by the user from 0% trigger pull to 100% trigger pull. The conduction band of the PWM duty cycle in this conventional method is 120°. The advance angle, while not shown in the graph, may be set to, for example, 30°. The question at hand is how to enhance performance of variable-speed power tools by increasing the conduction band (and optionally advance angle) without compromising the variable-speed functionality.

According to one embodiment, the tool may be operated at a higher conduction band (e.g., CB/AA=160/50°) all the time. In this case, the power tool will provide higher power output throughout the course of trigger displacement. This approach may not be desirable for certain power tool applications, particularly where high trigger resolution is desired at low speed.

According to an alternative embodiment, the tool may be operated with variable conduction band (e.g., CB/AA linearly varying from 120/30 to 160/50) as a function of trigger displacement. The problem with this approach may be that the controller is responsible for increasing PWM and CB/AA simultaneously as the trigger is pulled by the user, which may be too burdensome from a control perspective.

Figure 11:
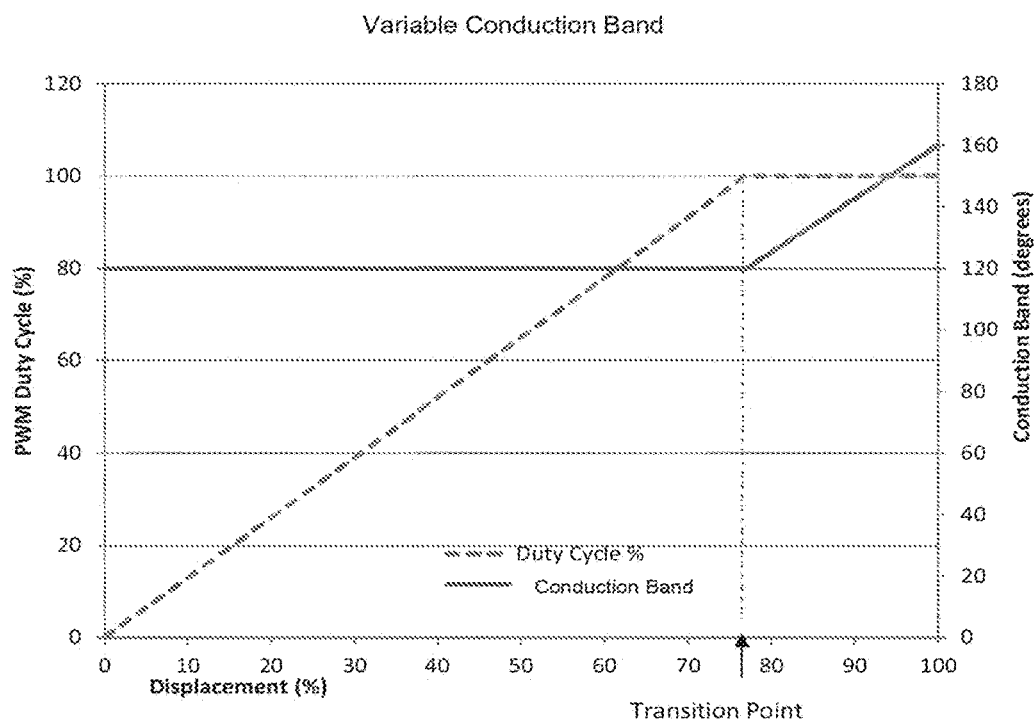
FIG. 11 is a graph depicting an example of a relationship between speed (i.e., PWM duty cycle) vs. trigger displacement (percentage of trigger pull), and conduction band vs. trigger displacement, in a power tool with variable conduction angle.

An alternative embodiment of the invention is described herein with reference to the speed vs. trigger displacement and conduction band vs. trigger displacement graph of FIG. 11. In this embodiment, the controller controls the PWM duty cycle of the motor from 0 to 100% within a first range of trigger displacement from zero trigger displacement up to a predetermined transition point (e.g., 78%) of trigger displacement. Throughout this first range of trigger displacement, the conduction band (and optionally advance angle) is kept constant at a first value (e.g., CB/AA=120/30°). Thereafter, within a second range of trigger displacement from the predetermined transition point to 100% of trigger displacement, the controller maintains the PWM duty cycle at 100% and modifies conduction band (and optionally advance angle) from the first value up to a second value (e.g., from 120/30° to 160/50°). In an embodiment, the controller is configured to vary the conduction band linearly. This embodiment allows the controller to increase conduction band for speed control after the PWM duty cycle has reached 100%. In another embodiment, the controller is configured to vary the conduction band in one or more discrete steps. This embodiment also allows the controller to increase conduction band for speed control after the PWM duty cycle has reached 100%.

While reference is made to PWM control for DC power tools in the embodiment described above, it must be understood that a similar method may be used in variable-speed AC power tools using a brushless motor.

Figure 12:
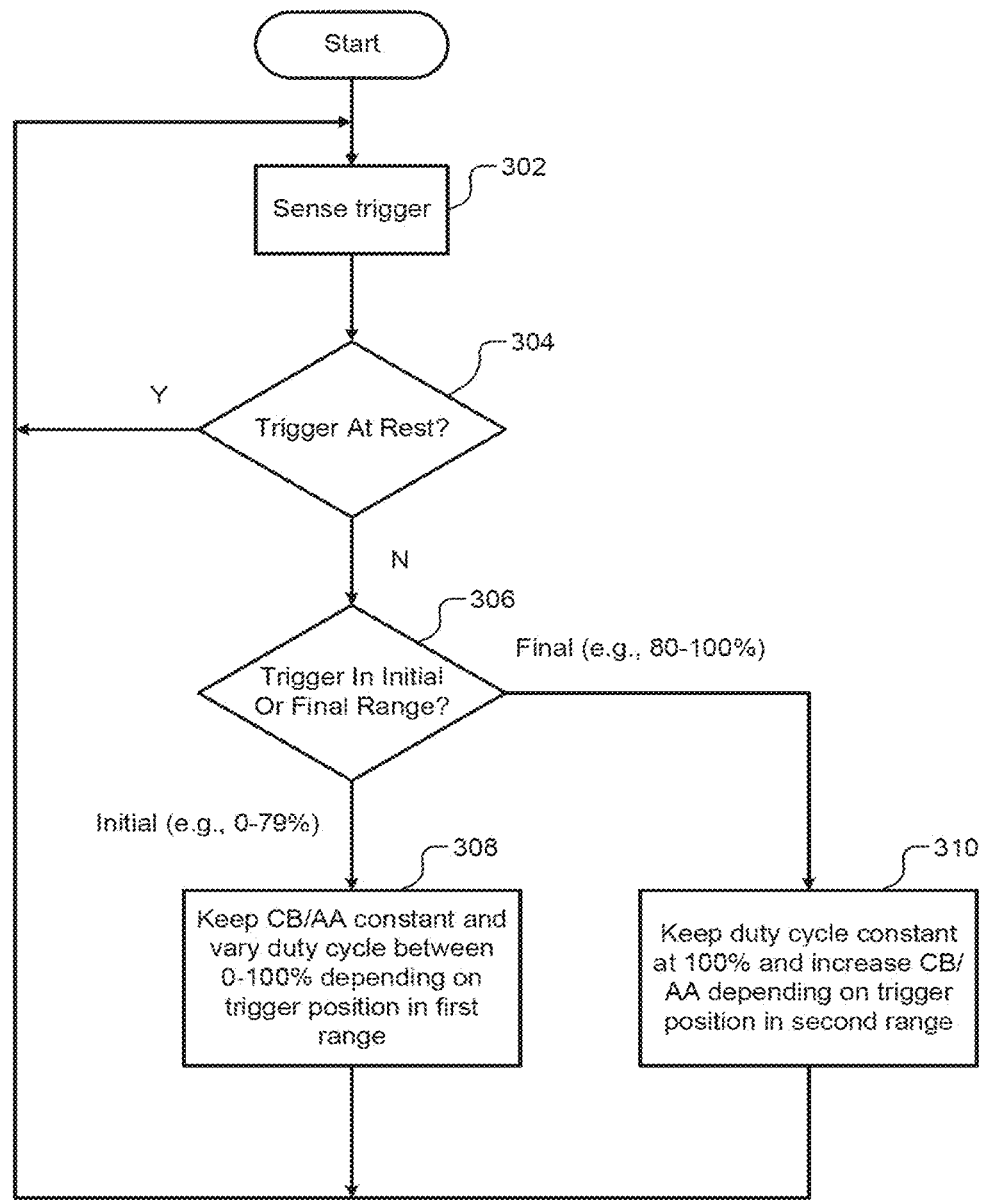
FIG. 12 is a flowchart depicting an example control scheme which may be used to control power delivered by a power tool.

Referring to FIG. 12, an example control scheme is shown which may be used to control power delivered by a power tool. In an example embodiment, the control scheme of FIG. 12 is implemented by the controller 230. The controller 230 senses trigger position at 302. The controller 230 determines at 304 if the trigger is at rest (not pulled at all). The controller 320 continues to sense trigger position if the trigger is at rest (not pulled at all). If the trigger is not at rest (i.e., if the trigger is pulled and therefore displaced by any amount), the controller 320 determines at 306 if the trigger position is in an initial range (e.g., less than 80% pulled) or a final range (e.g., more than 80% pulled). If the trigger position is in the initial range (e.g., less than 80% pulled), at 308, the controller 320 keeps CB/AA constant and varies the duty cycle of the PWM signal between 0-100% depending on the trigger position in the initial range. If the trigger position is in the final range (e.g., more than 80% pulled), at 310, the controller 320 keeps the duty cycle of the PWM signal constant at 100% and varies the CB/AA depending on the trigger position in the final range.

Figure 13:
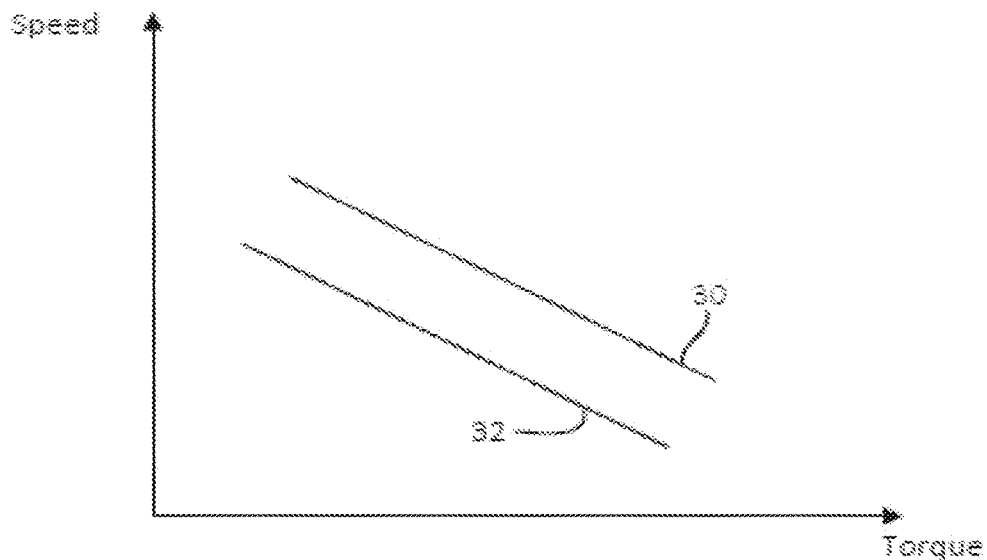
FIG. 13 is a diagram depicting the effect of battery drainage on the torque-speed curve of a tool.
Figure 14:
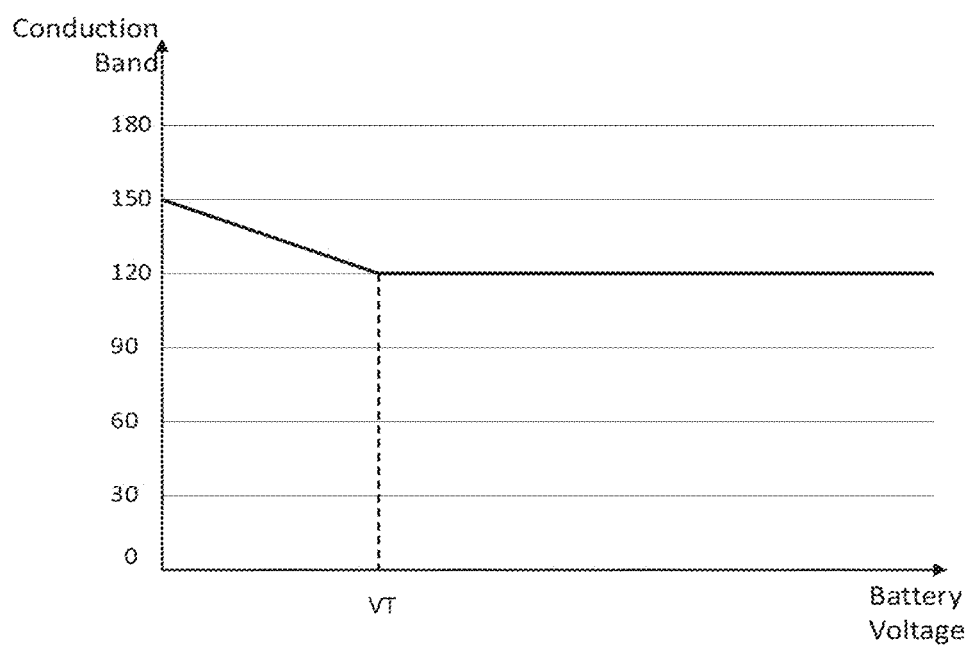
FIG. 14 is a diagram depicting an example of a relationship between conduction band and battery voltage in an example control scheme which may be used to increase tool usage as the battery drains.

Another aspect of the invention is described herein with reference to FIGS. 13 and 14. In DC power tools using brushless motors powered by a battery (both variable-speed and constant-speed power tools), the motor power output is affected by the battery power. As the battery drains, the motor power output is consequently decreased. The effect of battery drainage is depicted in the torque-speed curve of FIG. 13. In this figure, the torque-speed curve moves from 30 to 32 as the battery drains. What is desired is to boost the speed when the battery level is low to allow the use to maximize the use of the power tool.

In variable-speed tools, one way to compensate for low battery voltage is by increasing the PWM duty cycle. For example, at half-trigger pull, the PWM duty cycle may be increased from 50% to 75% or more depending on the battery voltage. The issue with this solution, however, is that high PWM duty cycle causes too much power loss and generates too much heat from the power switches. Also this solution is not applicable to constant-speed tools (i.e., tools with no variable-speed trigger switch or speed dial).

According to an embodiment of the invention, in order to compensate for low voltage of the battery, the voltage of the battery is monitored by the controller 106 (see FIG. 2A) and, if the voltage at battery B+ terminal falls below a certain threshold (e.g., 4V), the conduction band (and optionally advance angle) is increased in order to increase the amount of voltage provided to the motor. U.S. Pat. No. 8,274,261 discloses an example arrangement for monitoring battery voltage which may be integrated into the tool and is incorporated in its entirety herein by reference. Other arrangements for monitoring battery voltage are also contemplated by this disclosure.

FIG. 14 depicts a graph of the conduction band vs. battery voltage, according to an embodiment. In this embodiment, the conduction band (and advance angle) is maintained at a constant, e.g., 120 (and 30) degrees above a certain battery voltage threshold VT. Once battery voltage drops below voltage threshold VT, conduction band (and optionally advance angle) is linearly increased to, for example, 150 (and 45) degrees and as the battery voltage drops. In an embodiment, the voltage threshold VT may be, for example, 5V.

In one embodiment, the values for CB and/or AA are retrieved from a look-up table based on the current battery voltage measure. A portion of an example look-up table is as follows.

| Battery voltage (volts) | CB | AA |
|---|---|---|
| 19 | 127 | 34 |
| 18 | 135 | 37 |
| 17 | 142 | 41 |
| 16 | 150 | 45 |

CB and/or AA are then adjusted in accordance with the retrieved values. It is envisioned that other techniques for determining the adjustment amount fall within the scope of this disclosure.

In an embodiment of the invention, the increase in conduction band continues below the first voltage threshold VT until the battery voltage drops below a second cut-off threshold (e.g., 2V, not shown). The cut-off threshold may represent an under-voltage condition being detected, according to an embodiment. In an embodiment, under-voltage condition may also be detected if the voltage level of an individual battery cell or a sub-set of battery cells falls below a predetermined voltage threshold. Once an under-voltage condition is detected, the supply of power to the motor may be cut-off in order to protect the battery cells from damage. In an alternative embodiment, the cut-off threshold may represent other imminent tool condition including, but not limited to, battery over-temperature, tool over-temperature, over-current, etc.

In an embodiment of the invention, the change in conduction band (and advance angle) may not be linear. For example, varying the CB/AA in relation to the battery voltage may include a curved or stepped profile. The curved or stepped profile may be generated using a suitable equation, where the CB/AA is expressed as a nonlinear function or a staircase function of the battery voltage.

Also in an embodiment, the conduction band (and advance angle) may be increased throughout a full battery discharge cycle and not below a threshold VT. For example, for an 18V battery, CB/AA may begin to increase as soon battery charge begins to fall below 18V.

Figure 15:
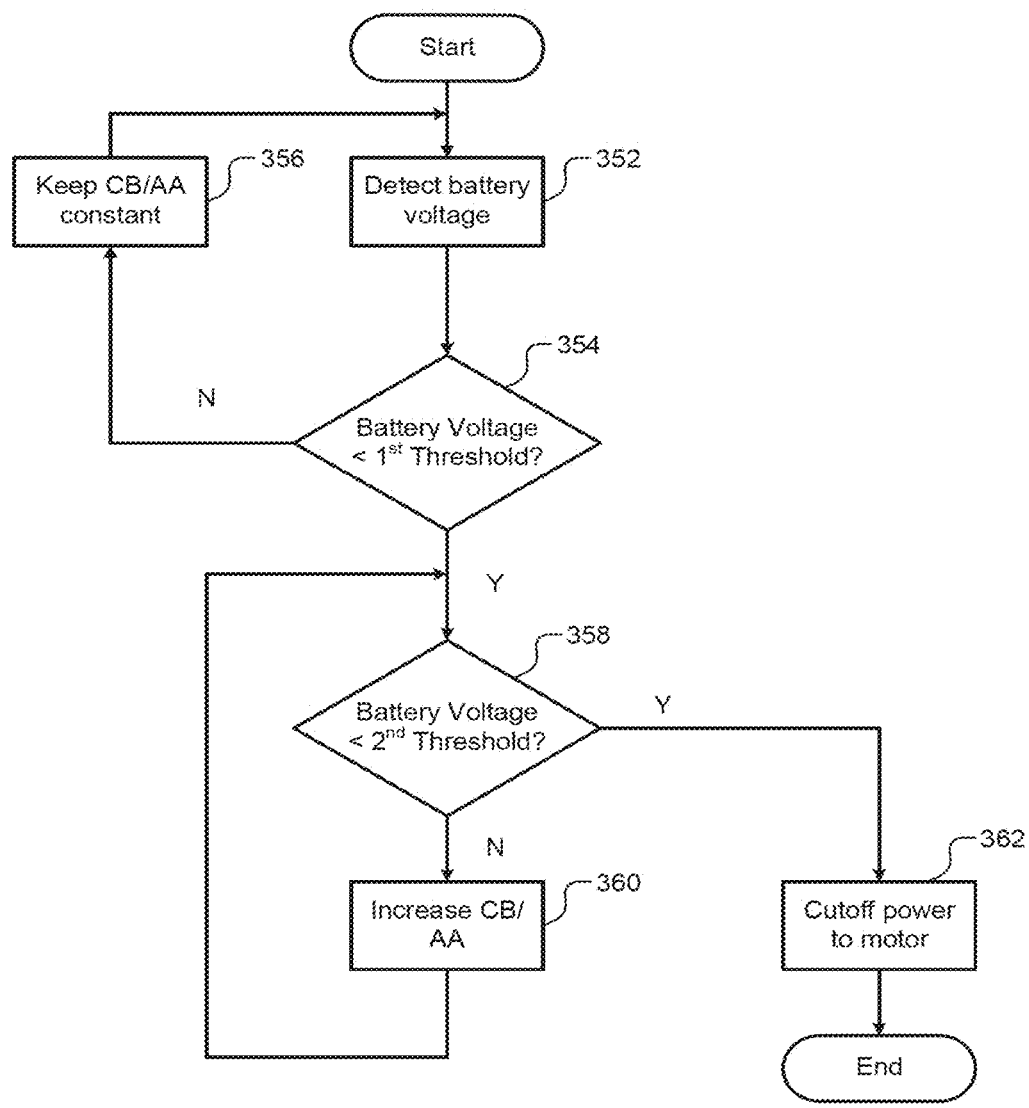
FIG. 15 is a flowchart depicting an example control scheme which may be used to increase tool usage as the battery drains.

Referring to FIG. 15, an example control scheme is shown which may be used to increase tool usage as the battery drains. In an example embodiment, the control scheme of FIG. 17 is implemented by the controller 230. The controller 320 detects the battery voltage at 352. The controller 320 determines at 354 if the battery voltage is less than a first threshold, where the first threshold is less than the rated voltage of the battery. The controller 320 keeps the CB/AA constant at 356 if the battery voltage is not less than a first threshold. If battery voltage is less than a first threshold, the controller 320 determines at 358 if the battery voltage is less than a second threshold, where the second threshold is less than the first threshold. If the battery voltage is less than the first threshold but not less than the second threshold, at 360, the controller 320 increases CB/AA and continues to determine if the battery voltage is less than the second threshold. If the battery voltage is less than the second threshold, the controller 320 stops supplying power to the motor at 362.

The description of the invention is merely exemplary in nature and, thus, variations that do not depart from the gist of the invention are intended to be within the scope of the invention. Such variations are not to be regarded as a departure from the scope of the invention.

It is also noted that all the speed, torque, and power parameters and ranges shown in any of these figures and discussed above are exemplary by nature and are not limiting on the scope of this disclosure. While some power tools may exhibit similar performance characteristics shown in these figures, other tools may have substantially different operational ranges.

Some of the techniques described herein may be implemented by one or more computer programs executed by one or more processors, controllers and/or control units residing, for example on a power tool. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power tool, comprising:
    a brushless direct current (BLDC) motor having a stator defining a plurality of phases;
    a switching arrangement having a plurality of motor switches connected electrically between a power source and the BLDC motor and operates to deliver power to the BLDC motor;
    an input unit operates between an initial position and an end position and outputs a signal indicative of target power delivered to the BLDC motor in accordance with position of the input unit; and
    a controller interfaced with the input unit and the plurality of motor switches and operates to, for each phase:
        output a pulse-width modulated (PWM) signal having a duty cycle to one or more of the plurality of motor switches to control supply of power to the BLDC motor;
        control a conduction band of the one or more of the plurality of motor switches corresponding to the phase of the BLDC motor;
        within a first positional range of the input unit between the initial position and a predetermined position, increase the supply of power to the BLDC motor by increasing the duty cycle of the PWM signal from a minimum duty cycle to a maximum duty cycle as a function of the position of the input unit while keeping the conduction band constant at a minimum conduction band; and
        within a second positional range of the input unit between the predetermined position and an end position, increase the supply of power to the BLDC motor by increasing the conduction band from the minimum conduction band to a maximum conduction band as a function of the position of the input unit while keeping the duty cycle constant at the maximum duty cycle.

2. The power tool of claim 1 wherein the minimum duty cycle is 0 and the maximum duty cycle is 100%.

3. The power tool of claim 1 wherein the controller further operates to, for each phase:
    keep an advance angle corresponding to the phase of the motor at a minimum advantage angle within the first positional range of the input unit; and
    increase the advance angle from the minimum advance angle to a maximum advance angle within the second positional range of the input unit.

4. The power tool of claim 1, wherein in response to a number of the plurality of phases being three, for each phase, the minimum conduction band is 120 degrees.

5. The power tool of claim 1 wherein, for each phase, the conduction band is varied linearly within the second positional range of the input unit.

6. The power tool of claim 1 wherein, for each phase, the conduction band is varied in a stepwise fashion within the second positional range of the input unit.

7. The power tool of claim 1 wherein the initial and end positions respectively represent no displacement and full displacement of the input unit.

8. The power tool of claim 1 wherein the predetermined position of the input unit represents 80% of a fully displaced position of the input unit.

9. The power tool of claim 1 wherein the input unit is a variable speed trigger switch, a speed dial, a touch sensor, or a capacitive sensor.

10. The power tool of claim 1 wherein the input unit is configured to perform one or more of ON/OFF, forward/reverse, and variable speed operations.

11. A power tool, comprising:
a brushless direct current (BLDC) motor having a stator defining a plurality of phases;
a switching arrangement having a plurality of motor switches connected electrically between a power source and the BLDC motor and operates to deliver power to the BLDC motor;
an input unit operates between an initial position and an end position and outputs a signal indicative of target power delivered to the BLDC motor in accordance with position of the input unit; and
a controller interfaced with the input unit and the plurality of motor switches and operates to, for each phase:
output a pulse-width modulated (PWM) signal having a duty cycle to one or more of the plurality of motor switches to control supply of power to the BLDC motor;
control an advance angle of the one or more of the plurality of motor switches corresponding to the phase of the BLDC;
within a first positional range of the input unit between the initial position and a predetermined position, increase the supply of power to the BLDC motor by increasing the duty cycle of the PWM signal from a minimum duty cycle to a maximum duty cycle as a function of the position of the input unit while keeping the advance angle constant at a minimum advance angle; and
within a second positional range of the input unit between the predetermined position and an end position, increase the supply of power to the BLDC motor by increasing the advance angle from the minimum advance angle to a maximum advance angle as a function of the position of the input unit while keeping the duty cycle constant at the maximum duty cycle.

12. The power tool of claim 11 wherein the minimum duty cycle is 0 and the maximum duty cycle is 100%.

13. The power tool of claim 11 wherein the controller further operates to, for each phase:
keep a conduction band corresponding to the phase of the motor at a minimum conduction band within the first positional range of the input unit; and
increase the conduction band from the minimum conduction band to a maximum conduction band within the second positional range of the input unit.

14. The power tool of claim 11 wherein in response to a number of the plurality of phases being three, for each phase, the minimum advance angle is 30 degrees.

15. The power tool of claim 11 wherein, for each phase, the advance angle is varied linearly within the second positional range of the input unit.

16. The power tool of claim 11 wherein, for each phase, the advance angle is varied in a stepwise fashion within the second positional range of the input unit.

17. The power tool of claim 11 wherein the initial and end positions respectively represent no displacement and full displacement of the input unit.

18. The power tool of claim 11 wherein the predetermined position of the input unit represents 80% of a fully displaced position of the input unit.

19. The power tool of claim 11 wherein the input unit is a variable speed trigger switch, a speed dial, a touch sensor, or a capacitive sensor.

20. The power tool of claim 11 wherein the input unit is configured to perform one or more of ON/OFF, forward/reverse, and variable speed operations.

* * * * *